United States Patent [19]

Koves et al.

[11] Patent Number: 5,130,106
[45] Date of Patent: Jul. 14, 1992

[54] MOVING BED RADIAL FLOW REACTOR FOR HIGH GAS FLOW

[75] Inventors: William J. Koves, Hoffman Estates; Roger L. Throndson, Schaumburg, both of Ill.

[73] Assignee: UOP, Des Plaines, Ill.

[21] Appl. No.: 290,933

[22] Filed: Dec. 28, 1988

[51] Int. Cl.$^5$ .............................................. B01J 8/12
[52] U.S. Cl. ........................................ 422/216; 55/474; 55/479; 422/218; 422/219; 422/239
[58] Field of Search ............... 422/192, 213, 216, 218, 422/219, 239; 208/165, 173; 55/474, 479

[56] References Cited

U.S. PATENT DOCUMENTS

| | | | |
|---|---|---|---|
| 2,303,717 | 12/1942 | Arveson | 422/213 |
| 2,846,367 | 8/1958 | Lifland | 208/165 |
| 2,846,368 | 8/1958 | Payne | 422/216 |
| 3,647,680 | 9/1969 | Greenwood et al. | 208/65 |
| 3,692,496 | 4/1971 | Greenwood et al. | 23/288 G |
| 3,706,536 | 5/1971 | Greenwood et al. | 23/288 G |
| 3,799,866 | 3/1974 | Lengemann | 422/216 |
| 3,825,116 | 7/1974 | Greenwood | 209/141 |
| 3,927,987 | 12/1975 | Winter, III et al. | 422/219 |
| 3,978,150 | 8/1976 | McWilliams, Jr. | 260/683.3 |
| 4,035,170 | 7/1977 | Lear, Jr. et al. | 55/474 |
| 4,040,794 | 8/1977 | Stone | 422/216 |
| 4,044,102 | 8/1977 | Muraki et al. | 55/474 |
| 4,135,886 | 1/1979 | Kuchar | 422/216 |
| 4,141,690 | 2/1979 | Persico et al. | 422/216 |
| 4,233,268 | 11/1980 | Boret et al. | 422/218 |
| 4,277,444 | 7/1981 | Van Landeghem | 422/218 |
| 4,421,723 | 12/1983 | Farnham | 422/218 |

*Primary Examiner*—Robert J. Warden
*Assistant Examiner*—Amalia Santiago
*Attorney, Agent, or Firm*—Thomas K. McBride; John G. Tolomei

[57] ABSTRACT

Void blowing by gas flow through a bed of particulate material is avoided by the use of a cover plate that eliminates void spaces at the top of the bed and a vertical duct that allows a head of particulate material to be maintained above the cover plate. The particle bed is arranged in the usual fashion using inner and outer screens to hold particulate material in a vertically extended bed into which particulate material is intermittently added and withdrawn. The top of the particulate bed is contacted by an imperforate cover plate that is sloped up to an inlet opening that has a smaller cross-sectional area than the area of the bed. The cover plate has a slope which is greater than the angle of the repose of the particles so that particles filling the top section of the bed will be free of void spaces. The cover plate also has a relatively small inlet opening so that a small volume of catalyst particles can provide a head of particles above the inlet opening to resist upward pressure that otherwise forms voids at the inlet screen surface. This cover plate arrangement also minimizes bed heights and overall reactor height necessary to provide the head of particles for resisting upward pressure.

11 Claims, 6 Drawing Sheets

MOVING BED RADIAL FLOW REACTOR FOR HIGH GAS FLOW

This invention relates generally to the field of fluid particle contact and more specifically to apparatus for the moving bed design of radial or horizontal flow fluid solid contacting apparatus. More specifically, this invention is related to an apparatus for the contacting of a high velocity stream with particulate material in particle bed from which particles are periodicically withdrawn.

BACKGROUND OF THE INVENTION

A wide variety of processes use radial or horizontal flow reactors to effect the contact of particulate matter with a gaseous stream. These processes include hydrocarbon conversion adsorption and exhaust gas treatment. In most of these processes, contact of the particulate material with the fluid decreases the effectiveness of the particulate material in accomplishing its attendant function. In order to maintain the effectiveness of the process, a system has been developed whereby particulate material is semi-continuously withdrawn from the contacting zone and replaced by fresh particulate material so that the horizontal flow of fluidized material will constantly contact particulate material having a required degree of effectiveness. Typical examples and arrangements for such systems can be found in U.S. Pat. No. 3,647,680, U.S. Pat. No. 3,692,496 and U.S. Pat. No. 3,692,496 and U.S. Pat. No. 3,706,536.

A good example of the way in which moving bed apparatus has been used for the contacting of fluids and solids is found in the field of petroleum and petrochemical processes especially in the field the hydrocarbon conversion reactions. A well-known process that uses a radial flow bed for the contact of solid catalyst particles with a vapor phase reactant stream is found in the reforming of naphtha boiling hydrocarbons. This process uses one or more reaction zones where the catalyst particles enter the top of the reactor and flow downwardly under gravity flow and are transported out of the first reactor. In many cases, a second reactor is located either underneath or next to the first reactor. Catalyst particles again move through the second reactor under gravity flow. After passing through the second reactor, the catalyst particles can go through a further series of reaction zones and are collected and transported to a regeneration vessel for the restoration of the catalyst particles by the removal of coke and other hydrocarbon by-products that are produced in the reaction zone and accumulate on the catalyst. In the reforming of hydrocarbons using the moving bed system, the reactants typically flow serially through the reaction zones. The reforming reaction is typically endothermic so the reactant stream is heated before each reaction zone to supply the necessary heat for the reaction. The reactants flow through each reaction zone in a substantially horizontal direction through a bed of catalyst. In most cases the catalyst bed is arranged in an annular form so that the reactants flow radially through the catalyst bed. Many other hydrocarbon conversion processes can also be effected with a system for continuously moving catalyst particles under gravity flow through one or more reactors having a horizontal flow of reactants. One such process is the dehydrogenation of paraffins as shown in U.S. Pat. No. 3,978,150. The catalyst particles in each reaction zone are retained between an inlet screen and an outlet screen that together form a vertical bed and allow the passage of vapor through the bed.

Experience has shown that the horizontal flow of reactants through the bed of catalyst can interfere with the gravity flow removal of catalyst particles. This phenomenon is usually referred to as hang-up or pinning and it imposes a constraint on horizontal flow reactor designs. Catalyst pinning occurs when the frictional forces between catalyst pills that resist the downward movement of the catalyst pills are greater than the gravitational forces acting to pull the catalyst pills downward. The frictional forces occur when the horizontal flow vapor passes through the catalyst bed. When pinning occurs, it traps catalyst particles against the outlet screen of the reactor bed and prevents the downward movement of the pinned catalyst particles. In a simple straight reactor bed, or an annular bed with an inward radial flow of vapors, pinning progresses from the face of the outlet screen and as the vapor flow through the reactor bed increases, it proceeds out to the outer surface of the bed at which point the bed is described as being 100% pinned. Once pinning has progressed to the outermost portion of the catalyst bed, a second phenomenon called void blowing begins. Void blowing describes the movement of the catalyst bed away from its outer boundary by the forces from the horizontal flow of vapor and the creation of a void between the inlet screen and the outer catalyst boundary. The existence of this void can allow catalyst particles to blow around or churn and create catalyst fines. Void blowing can also occur in an annular catalyst bed when vapor flows radially outward thorough the bed. With radially outward flow, void blowing occurs when the frictional forces between the catalyst pills are greater than the gravitational forces, or in other words, at about the same time as pinning would occur with a radially inward flow. Therefore, high vapor flow can cause void blowing in any type of radial or horizontal flow bed.

The production of fines can pose a number of problems in a continuous moving bed design. The presence of catalyst fines increases the pressure drop across the catalyst bed thereby further contributing to the pinning and void blowing problems. Catalyst fines can also accumulate in the narrow openings of the screen surfaces used to retain the catalyst particles thereby plugging these surfaces and requiring a shut-down of the equipment to remove catalyst fines. Catalyst fines are usually more abrasive than the larger catalyst particles and thereby contribute to greater erosion of the process equipment. Finally, the catalyst in many of these hydrocarbon conversion processes is a valuable commodity and the generation, and removal of catalyst fines imposes a direct catalyst cost on the operation of the system. Further discussion of catalyst fines and the problems imposed thereby can be found in U.S. Pat. No. 3,825,116 which also describes an apparatus and method for fines removal.

Where possible, horizontal or radial flow reactors are designed and operated to avoid process conditions that will lead to pinning and void blowing. This is true in the case of moving bed and non-moving bed designs. Apparatus and methods of operation for avoiding or overcoming pinning and void blowing problems are shown in U.S. Pat. No. 4,135,886, 4,141,690 and 4,250,018.

In some processes, particularly the dehydrogenation of paraffins, radial flow bed designs are used with very high velocities that produce a catalyst bed that is more than 100% pinned and in most cases will exceed 200% pinned. Thus, these beds are subjected to void blowing as well as pinning. However, operational experience with these types of beds have been satisfactory despite the existence of void blowing due to the very high gas velocity which prevents the generation of fines and the discontinuous operation of these processes. The very high gas velocities used in these processes is believed to prevent the erosion of catalyst after the formation of voids by imposing sufficient drag forces on individual catalyst particles to keep the individual particles from blowing around or churning within the void. Hence, erosion is not a problem when voids are formed if the gas velocity is sufficient to hold individual particles against the free surface of the void. In addition to the high gas velocity preventing erosion, the discontinuous nature of operation as typically practiced in these processes also avoids the accumulation of any fines that might be generated since the process is operated until the catalyst is completely replaced so that the majority of any fines that might be generated are also removed at the time of catalyst replacement. Therefore, in a discontinuous process having a very high gas velocity across the particle bed, the generation of fines may not pose significant problems. However, it would be highly desirable to have an apparatus that would prevent void blowing and thereby permit the use of a moving particulate bed in processes that use a high gas velocity.

Accordingly, it is an object of this invention to provide an apparatus for a gravity flow moving particle bed that prevents the occurrence of void blowing.

It is a further object of this invention to reduce the generation of fine particulate matter in the operation of a fluid solid contacting bed that uses gravity flow to remove and replace particles.

It is a more specific object of this invention to provide an apparatus for the dehydrogenation of paraffinic hydrocarbons by the continuous contact of paraffin vapors with particulate catalyst in an apparatus having a continuous withdrawal and replacement of catalyst particles under gravity flow.

BRIEF SUMMARY OF THE INVENTION

This invention overcomes the problem of void formation by a substantially horizontal flow of gaseous material through a bed of particulate material by using a closed cover plate system and a low volume catalyst hold-up device. The closed cover plate system is designed to prevent the formation of voids at the screen surface by containing the particulate material in a void-free bed that stops movement of the particulate material and prevents high velocity gaseous material from pushing catalyst away from the inlet screen. The hold-up device retains particulate material above the open inlet of the cover plate to supply particles to the particle bed and resist upward pressure from the particles in the particle bed. The hold-up device has a reduced effective hydraulic diameter relative to the hydraulic diameter of the particle bed so that the hold-up device needs only a small vertical length to resist the upward pressure from the catalyst bed. In this way, the combination of a closed cover plate and a low volume hold-up device provides a large containment force that resists void formation without significantly increasing particle volume or the height of the particle bed and the contacting apparatus.

In a broad embodiment, this invention is an apparatus for retaining particulate material in a horizontal flow bed and contacting the particulate material with a gaseous material. The apparatus includes a pair of vertical partitions in a spaced apart relationship that at least partially define a particle retention space and a retention space opening in an upper section of the partitions for passing particles into the retention space. The partitions are perforated to permit transfer of the gaseous medium across the particle retention space. Particle transfer out of the retention space is controlled by a bottom closure that blocks the movement of particles out of the retention space. A top closure at least partially defines the top of the particle retention space and has an imperforate cover plate that overlies the retention space opening and defines an inlet opening at the uppermost end of the cover plate. The inlet opening has a smaller cross-sectional area than the retention space opening. The cover plate has a surface facing the inside of the retention space that extends from the inlet opening to the partitions and slopes downward in all directions from the inlet opening at an angle equal to at least the static angle of repose of the catalyst. The angle of the cover plate surface is measured in a vertical plane that is located normal to the side of the inlet opening about which the surface angle is measured. Above the cover plate, the apparatus includes means for passing particles into the inlet opening and retaining particles above the inlet opening.

In a more limited embodiment, this invention is a radial flow bed arrangement for contacting particles with a gaseous material. The arrangement includes a vertically oriented centerpipe having a plurality of perforations and a hollow interior for gas transfer. The centerpipe is surrounded by an outer retention screen that defines an annular retention space for retaining particles. Means are provided for transferring gaseous material across the centerpipe and the outer retention screen to establish gas flow across the annular retention space. An imperforate cover plate is positioned over the annular opening at the top of the particle retention space to retain particles in the retention space. The cover plate defines a particle inlet opening at its uppermost end. The inlet opening has a total cross-sectional area the equals less than half of the cross-sectional area of the annular opening. The cover plate also has a surface along the inside of the retention space that extends from the inlet opening to the centerpipe and the outer retention screen and slopes downward in all directions from the inlet opening at an angle of at least 19° from the horizontal. At least one vertically extended duct communicates with the particle inlet opening to transfer particles into the particle retention space. In order to transfer particles out of the retention space, means are provided for intermittently withdrawing particles from the bottom of the particle retention space.

In a yet more limited embodiment, this invention is a radial flow reactor for contacting particulate catalyst with the gaseous material. The reactor comprises a vertically oriented reactor vessel, an outer catalyst retention screen disposed vertically within the reactor, and a gas distribution space between the reactor vessel and the outer retention screen for distributing gaseous material. The reactor vessel also has a vertical centerpipe located inside the catalyst retention screen, a catalyst retention space between the outer screen and the centerpipe and a gas collection space inside the centerpipe for collecting gaseous material. An imperforate cover plate covers the top of the catalyst retention space to retain the catalyst in the retention space. The cover plate has a first frusto-conical section fixed to the centerpipe that extends in an outwardly direction at an upward angle of at least 19°. The imperforate cover plate includes a second frusto-conical section that is fixed with respect to the outer retention screen, and slidably engaged with and overlapping the first cover plate section. The second section has the same slope as the first section and defines an annular catalyst inlet opening at its upper end. The annular catalyst opening has an outer radius that is coextensive with the outer retention screen and a radial width equal to less than half the radial width of the catalyst retention space. At least one vertically extended duct communicates with the annular catalyst inlet and transfers catalyst into the catalyst retention space. A plurality of vertically extending catalyst transfer pipes communicate with the interior of the duct to transfer catalyst into the retention space. Means are also provided for intermittently withdrawing catalyst particles from the bottom of the catalyst retention space.

Other objects, embodiments and details of this invention are disclosed in the following detailed description.

DETAILED DESCRIPTION OF THE INVENTION

For the purposes of simplifying this description, this invention will be described in the context of a radial flow reactor vessel having an intermittent flow of particles through an annular form catalyst bed. The description of this invention in the context of a radial flow catalyst bed is not intended to limit the broad application of this invention ot the details disclosed herein. The particle containment system of this invention can be applied to any form of moving bed contacting system where particles flow downward in a fixed bed and fluid contacts the particles by horizontal movement through the fixed bed.

It has been discovered that the void spaces caused by high velocity flow of gaseous materials through a catalyst bed can be reduced or eliminated if the bed is contained to prevent displacement of the particles from the surface of the inlet screen. Void blowing at the inlet screen can be caused by the displacement of catalyst particles into other areas of the particle bed or an overall upward displacement of the catalyst bed. The displacement of catalyst particles into other void areas is eliminated by designing the partitions and enclosures that retain the catalyst particles in a way that eliminates void spaces. Overall upper displacement of the catalyst bed is eliminated by providing sufficient resistance to upward pressure. Thus, this invention is a combination of a bed containment arrangement that eliminates void spaces within the beds and a means for resisting upward pressure on the particles in a fixed bed.

Figure 1:
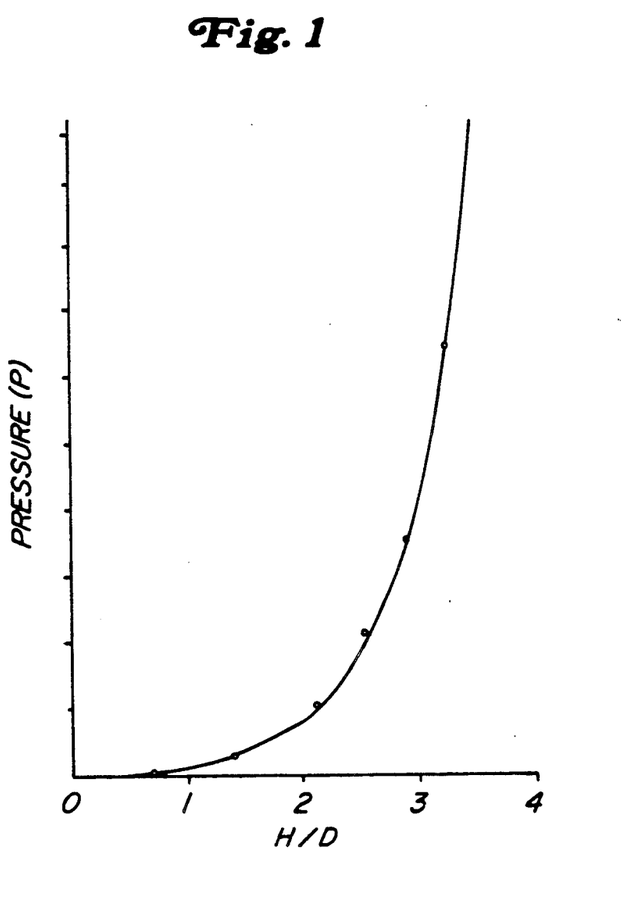
FIG. 1 is a graph showing minimum displacement pressure as a function of the height to diameter ratio of particles in a circular conduit.

In moving bed systems, it is also important that whatever system is used to prevent upward movement of the catalyst bed, that this system not interfere with the addition and withdrawal of particles from the particle bed. As a result whatever system is used to resist the upward pressure of the particle bed, it must still have an open inlet that allows free addition of particles. The resistance of an open bed of particles to upward pressure is a function of the weight of particles above the point at which the pressure loading is applied, friction between the particles and forces imposed by any gas flow through the particles. In the case of fluidized beds, there is an upward gas velocity which is sufficient to lift the particles and eliminate friction between the catalyst particles so that the bed behaves as a fluid. However, this invention is applied to moving beds that operate with little upward gas flow and are not in a fluidized state and so the particles behave as granular solids. Furthermore, the particles that counteract upward pressure are in a blanked-off section of the bed. The area above the inlet screen openings is described as a blanked-off section. This means that there is no appreciable gas flow through the particles in this section of the bed. As a result, the total upward pressure required to displace a given level of particles up a confined conduit is a function of the hydraulic diameter of the conduit and the length of particles above the point at which pressure is applied. FIG. 1 shows a relationship between the minimum upward pressure required to move catalyst particles up a vertical conduit as a function of the ratio of the height of the catalyst particles to the diameter of the circular conduit. As FIG. 1 shows, the pressure required to displace the bed increases exponentially with the height of the diameter ratio. The non-linear relationship between pressure and the height to diameter ratio shows that friction between the particles and the interior walls significantly increase the necessary pressure to upwardly displace the particles.

Accordingly, upward displacement of the particle bed, can be restrained by filling the particle bed with particles above the uppermost inlet screen opening and thereby increase the overall upward pressure necessary to displace the bed. However, to supply the additional height to the total open area of the bed will greatly increase the height of the particle bed. Where the particle bed is confined in a containment vessel, this increase in height also increases the overall containment vessel height. Furthermore, the particles are added to a blanked-off area of the particle bed. This section of the particle bed is inactive. Thus, the particle bed can be described as having an active section that begins below the uppermost portion of the perforated screens that retain the bed and an inactive section located above the uppermost portion of the perforations. Any additional volume of particles that must be added to the inactive section does not benefit the gas particle contacting operation. In this invention the required height of catalyst above the active section of the particle bed is reduced by decreasing the cross-section of the inactive bed section. Reducing the cross-sectional area of the inactive portion of the particle bed reduces the hydraulic diameter of the containment section holding the catalyst particles. Therefore, a greater upward pressure is required to move a lesser height of catalyst particles as the height to the diameter ratio increases with decreasing diameter. As a result, this invention can provide a high resistance to upward bed pressures with only a small inactive height of particles and a relatively low inactive volume of particles. Therefore, one essential element of this invention is a reduced diameter containment section that holds particles above the particle bed and allows particles to be passed into the particle bed.

Another important aspect of this invention is reducing the cross-sectional area of the bed by a transition section that provides an inlet opening having a smaller cross-sectional area than the total cross-section of the particle bed. In the past, particles were transferred into the particle bed by a series of particle transfer conduits. These conduits were typically passed through a flat cover plate at the top of the bed. As particles filled the bed conduits, the particles formed a series of cones on the upper surface of the bed having an apex at the outlets of the conduit and downwardly diverging sides. This arrangement typically left a void area above the conical mounds of particles and below the flat cover plate. These void areas at the top of the bed made it possible for high velocity gas flow to induce high pressures along the inlet face of the bed that displace particles upwardly in the catalyst bed and blow voids at the inlet face of the particle bed. In a design of some particle beds, the cover plate at the top of the particle bed may have angled surface that would reduce the void volume at the top of the particle bed. However, in these particle beds the angled surface does extend in all directions and there is still a substantial volume at the top of the bed into which particles do not flow when entering the bed so that a significant void volume still exists. For example, in the case of an annular bed that a significant void volume still exists. For example, in the case of an annular bed that receives particles from a series of catalyst transfer conduits, providing sides on the cover plate that slope in a radial direction, will only eliminate the void space immediate region of the catalyst transfer pipe and does not eliminate void areas that remain below the cover plate and between the particle transfer pipes. In order to prevent the void surfaces from forming beneath the top closure or cover plate of the particle bed, all surface of the top of the particle bed must have a slope from the point at which the catalyst enters the particle bed or the closure device that is at least equal to the angle of repose of the catalyst. For the majority of catalyst particles used in hydrocarbon processing, the necessary slope is approximately 19° from the horizontal. In this invention, the top closure or cover plates are arranged such that all interior surfaces from the uppermost particle entry point have a slope that at least equals the static angle of repose of the particles. More specifically the cover plate of this invention can be described as having a surface that slopes downward from the inlet opening at an angle of at least 19° from the horizontal. The slope angle is measured in a vertical plane that extends in a direction normal to the side of the inlet opening about which the angle is measured. In this way, particles that enter the particle bed completely fill all areas of the end closure so that no void volumes remain.

A more complete understanding of the apparatus of this invention and its arrangement can be obtained by the description of a particular apparatus used in a process for dehydrogenating hydrocarbons.

Figure 2:
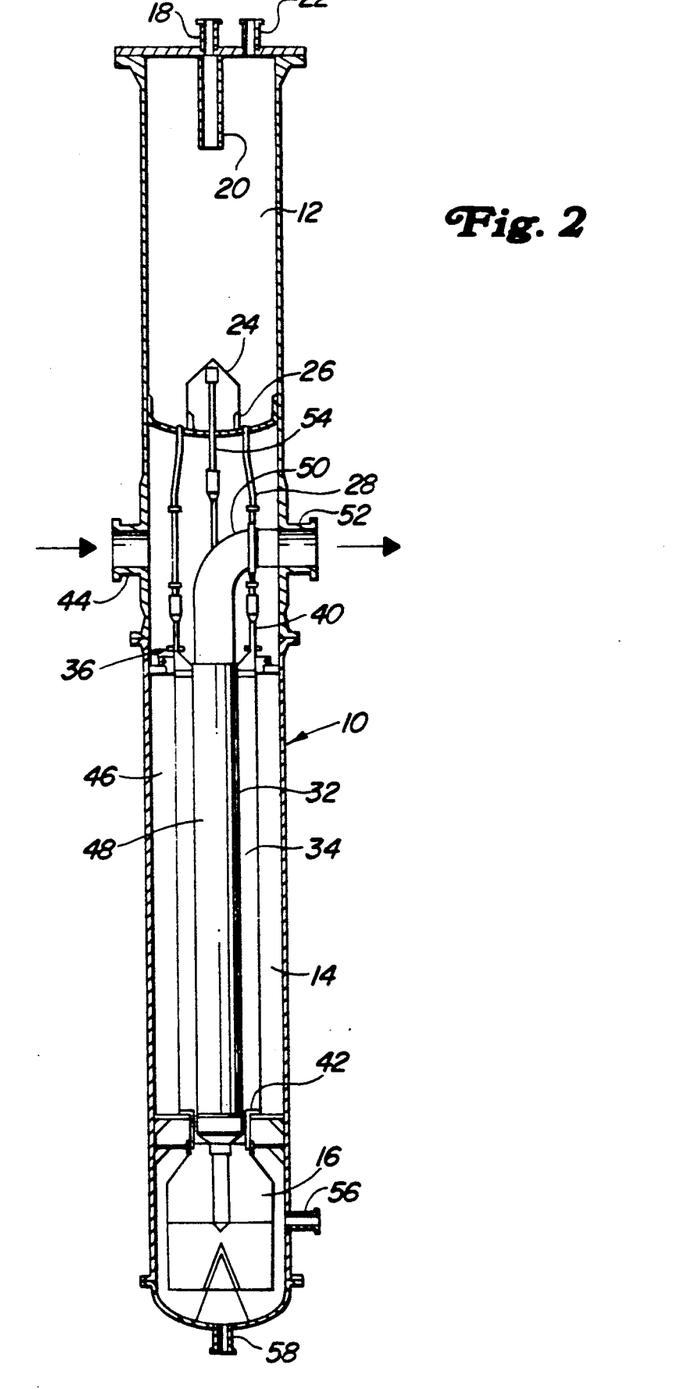
FIG. 2 is a cross-sectional elevation view of a reactor containing a radial flow catalyst bed adapted for removal of catalyst particles under gravity flow.

Looking then at FIG. 2, there is shown a cross-section of a reactor for converting paraffinic hydrocarbons to olefinic hydrocarbons by contact with a particulate catalyst and a semi-continuous addition and replacement of catalyst particles. The vertically oriented reactor vessel has a cylindrical shell 10 that confines a catalyst hopper 12, a reactor section 14, and a catalyst collector 16. At the top of catalyst hopper 12, there is a catalyst loading nozzle 18 for filling hopper 12 with fresh or regenerated catalyst particles. Nozzle 18 communicates with a catalyst loading pipe 20 which extends downwardly into catalyst hopper 12 and is used to control the level of catalyst particles within hopper 12. A reducing gas inlet nozzle 22 is located at the top of catalyst hopper 12 and supplies reducing gas to the catalyst particles within the hopper 12. A reducing gas collector 24 occupies the central portion of the bottom of hopper 12 and has one or more inlets 26 that permit reducing gas to flow into the interior of collector 24. A series of particle supply conduits 28 are spaced around the bottom of hopper 12 and communicate particles to the reactor section 14. When used in a reactor, these particle supply conduits are also referred to as catalyst transfer pipes.

The reactor section is composed of a pair of vertical partitions in the form of an outer retention screen 30 that surrounds a vertically oriented centerpipe 32. In the embodiment of FIG. 2, the cylindrical shape of the outer retention screen and centerpipe 32 define a particle retention space in the form of an annular retention space 34. The top of retention space 34 is covered by a top closure 36 that includes an imperforate cover plate 38. Catalyst particles from conduits 28 are transferred through the top closure 36 and into the particle retention space 34 by a vertically extended duct 40. Duct 40 provides a means for transferring the particles into an inlet of the cover plate and retaining catalyst particles above the cover plate 36. The bottom of particle retention space 34 is at least partially occluded by a plate 42 that provides a bottom closure which retains particles in the particle retention space 34. Reactants enter the reactor through a feed inlet nozzle 44. The feed inlet nozzle openly communicates with a gas distribution space 46 defined as that region lying directly outside the outer retention screen and within the reactor vessel 10. A plurality of perforations in the outer retention screen 30 and centerpipe 32 allow reactants to flow along a substantially horizontal flow path through the catalyst bed contained within particle retention space 34 and into a collection space 48 defined by the interior of the centerpipe 32. Reactants are then carried from collection space 48 through an effluent outlet tube 50 and an outlet nozzle 52. The feed inlet nozzle and the effluent outlet nozzle together with the distribution and collection space provide a means for establishing gas flow across the retention space. In order to withdraw reducing gas from reducing gas collector 24, a conduit 54 communicates the interior of collector 24 with effluent outlet tube 50.

The dehydrogenation of the paraffinic hydrocarbons is carried out in a conventional manner within the reaction zone. The feed to inlet nozzle 44 usually consists of a combination of fresh paraffinic hydrocarbon feed, recycled hydrogen and recycled unconverted hydrocarbons. In its preferred form, the dehydrogenation process consumes a feed hydrocarbon comprising normal paraffinic hydrocarbons bons having from 6 to 22 carbon atoms per molecule. The reactant stream is heated and the reactor is maintained at proper dehydrogenation conditions of temperature and pressure which are well known to those skilled in the art before it is passed through the bed of catalyst contained in retention space 34. The reactants entering the bed are in vapor phase condition. The effluent removed from nozzle 52 undergoes treatment for the separation of hydrogen by condensing the heavier components into a liquid phase process stream and the recovery of hydrogen and light hydrocarbon gas. This gas supplies hydrogen that is combined with the incoming feed stream. Process details for combining and heating the feed stream as well as the recovery and separation of effluent products are well known to those skilled in the art.

The composition of the dehydrogenation catalyst is not believed to materially effect the operation of the process provided the catalyst meets commercial standards for activity, stability and selectivity. Dehydrogenation catalysts are described in U.S. Pat. Nos. 3,274,287; 3,315,008; 3,315,008; 3,745,112; and 4,430,517. These catalysts are comprised of a platinum group component supported on a porous carrier material. The preferred carrier material is a refractory inorganic oxide such as gamma-alumina. The preferred dehydrogenation catalysts contain on an elemental basis 0.01 to 2 wt. % platinum group component and about 0.1 to 5 wt. % of an alkali or alkaline earth metal. Preferably, there is present 0.05 to 1 wt. % platinum group component and about 0.25 to 3.5 wt. % of the alkali or alkaline earth component. The platinum group component may be chosen from the group consisting of platinum, palladium, rhodium, ruthenium, osmium, and iridium, but platinum is highly preferred. The alkali or alkaline earth component may be selected from the group consisting of the alkali metals—cesium, rubidium, potassium, sodium, and lithium; and the alkaline earth metals—calcium, strontium, barium, and magnesium. This component is preferably either lithium or potassium, with lithium being especially preferred. Another example of a suitable dehydrogenation catalyst is a catalyst which in addition to the previously described platinum and alkali or alkaline earth metal components contains a tin component. This catalytic composite would contain from about 0.1 to about 1 wt. % tin. Yet another catalytic composite which should be highly suited for use in the subject process comprises an indium component in addition to the platinum, tin, and alkali or alkaline earth components. The indium component may be present on an elemental basis equal to about 0.1 to about 1 wt. % of the final composite. It is also known in the art that some catalytic composites of this nature may benefit from the presence of a small amount of a halogen component, with chlorine being the normally preferred halogen. Typical halogen concentrations in the final catalytic composite range from about 0.1 to about 1.5 wt. %. A halogen component is not desired in all situations. These catalytic composites are known to those skilled in the art and are described in the available references.

As the feed stream passes through the catalyst bed, the reaction proceeds and the catalyst remains in a static state throughout the reactor 10. Catalyst flow remains stagnant throughout the reactor system from catalyst collector 16 up through catalyst hopper 12. Hydrocarbons from the reactor section 12 are kept out of catalyst collector 16 by a purge gas which enters collector 16 through a purge nozzle 56. Purge gas from collector 16 passes into the collection space 48 through the bottom of the catalyst bed in retention space 34 and into lower openings of centerpipe 32.

After operating for a period of time, catalyst in retention space 34 is withdrawn through catalyst collector 16, catalyst in retention space 34 drops into collector 16, catalyst in hopper 12 fills retention space 34, and fresh or regenerated catalyst is added to replace the catalyst withdrawn from hopper 12. The frequency of catalyst replacement is selected to minimize catalyst coking and activity loss within the reactor section 14. In the typical dehydrogenation reaction, the flow of reactants across retention space 34 will be high enough to create forces across the catalyst bed that produce a 100% pinned condition for the catalyst particles. Therefore, as a first step in moving catalyst through the reactor system, the gas flow rate across the bed must be reduced in order to alleviate the pinned condition and allow catalyst to move freely under gravity flow. In a dehydrogenation reaction, a reduced flow can be obtained by by-passing a portion of the combined paraffin and hydrogen feed stream or reducing the concentration of feed or paraffins in the combined feed stream. When particles in the retention space 34 are no longer pinned, removal of particles from catalyst withdrawal nozzle 58 allows a downward movement of catalyst through collector 16, reactor section 14, and catalyst hopper 12 as previously described. Each time particles are removed in the reactor system, the volume of particles withdrawn is at least equal to the volume of the catalyst retention space in reactor section 14 so that the catalyst throughout the reactor section is completely replaced each time catalyst is removed. Catalyst removed from nozzle 58 enter suitable regeneration facilities for the oxidation of coke from the surface of the catalyst and regenerated catalyst particles are returned to nozzle 18 to obtain a desired level of catalyst particles in the catalyst hopper.

As new catalyst enters retention space 34, a top closure designed in accordance with this invention ensures that the top of the catalyst bed will be free of void spaces. The closure at the top of each catalyst bed is more fully illustrated in FIG. 3. Catalyst particles flowing through the catalyst transfer pipe 28 are transferred into an enlarged conduit section 60. Enlarged conduit section 60 is provided so that catalyst transfer pipe 28 telescopes into enlarged conduit 60 and may move relative to the conduit section 60 and the particle bed in general. Relative movement between the transfer pipes and top closure 36 is necessary to accommodate differential thermal expansion between different parts of the reactor internals. A reducer section 62 funnels catalyst particles from each enlarged conduit 60 into duct 40. Duct 40 communicates catalyst particles to an inlet opening 64 located at the top of cover plate 38. Inlet opening 64 has an elongated shape in the form of an annular opening and duct 40 circumferentially distributes the catalyst particles through a plurality of scoops 88 over the elongated inlet opening which in its preferred form is referred to as an annular opening. The cover plate 38 covers the top of retention space 34 and extends from centerpipe 32 to outer retention screen 30. The cover plate 38 also defined the inlet opening 64. Except for the area left open for inlet opening 64, the cover plate completely seals the top of retention space 34. By completely covering the top of retention space 34, the cover plate 38 contains the catalyst particles and prevents upward movement. Inlet opening 64 is located at the uppermost portion of cover plate 38 and cover plate 38 slopes downward in all directions from inlet opening 64 at an angle that is greater than the static angle of repose of the catalyst. For most catalysts, this angle is at least 19° from the horizonatl. As catalyst flow through the reactor system stops and the level of stagnant catalyst rises in retention space 34, it eventually reaches the uppermost end of retention space 34 and crosses a retention space opening 66 which, due to the circular centerpipe and outer retaining screen, is in the form of annnular opening. As the stagnant level continues to rise, the catalyst particles completely fill the area below the inner surface of cover plate 38. The sloped cover plate provides an inlet opening at its top that is substantially smaller than the retention space opening. The reduced hydraulic diameter of the inlet opening allows the catalyst that is retained above the opening in duct 40 to provide a large resistance to upper movement of the bed.

Figures 3, 4:
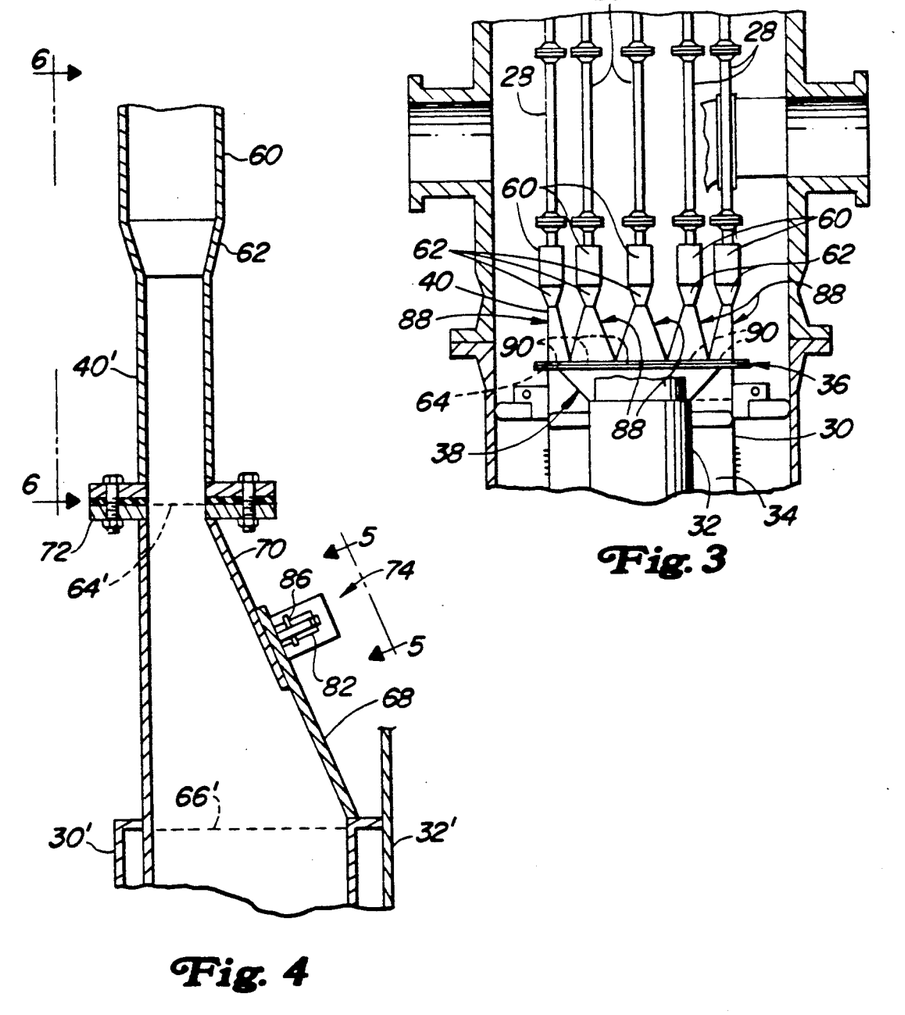
FIG. 3 is an enlarged view of an upper section of the reactor and catalyst bed shown in FIG. 1.
FIG. 4 is an enlarged view of a portion of the reactor and catalyst bed shown in FIG. 3.

The cover plate 38 is preferably composed of two sections to accommodate differential thermal expansion of the outer retention screen relative to the centerpipe. Most hydrocarbon conversion processes are exothermic or endothermic in nature. As a result, the temperature on the inner and outer bed surfaces will usually vary sometimes by as much as 100° F. or more. The paraffin dehydrogenation process is endothermic in nature so that the centerpipe will expand less than the outer retention screen. If a solid cover plate extended between the centerpipe and the outer retention screen, it would be subjected to high thermal stresses. FIG. 4 shows an enlarged view of a top closure for a retention space that has a two-piece cover plate. In this arrangement, a lower cover plate section 68 is welded to a centerpipe section 32' and an upper cover plate section 70 is welded to the inside portion of a particle supply nozzle 72 which is in turn rigidly connected to a duct section 40'. Duct section 40' is rigidly connected to an outer retention screen 30'. The two cover plate sections 68 and 70 are free to slide relative to each other and thereby accommodate differential thermal expansion between the centerpipe and the outer retention screen. A sliding connection 74 keeps the two cover plate sections together and prevents catalyst particles from escaping between the cover plate sections. Both upper and lower cover plate sections 70 and 68 are in the form of frusto-conical sections.

Figure 5:
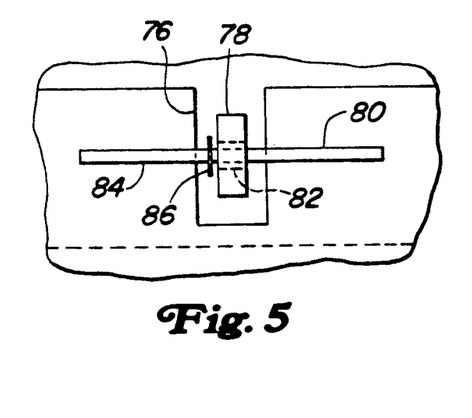
FIG. 5 is a transverse view of a slidable cover plate connection shown in FIG. 4.

The sliding connection between cover plate sections 68 and 70 is shown in FIG. 5. Lower section 68 has a vertically extending notch 76. A retainer clip 78, welded to the outside of section 70, is positioned in notch 76. A wedge pin 80 passes through a hole 82 in retainer clip 78. Wedge pin 80 has a tapered upper surface 84 that engages the top of retainer clip 78 and the outer surface of lower cover plate section 68 on both sides of notch 76 to keep lower and upper cover plate section 68 and 70 closely in contact while permitting relative sliding movement therebetween. In this manner, the upper and lower cover plate sections are slidingly engaged to permit relative movement between the centerpipe and the outer retention screen. A small pin 86 is engaged in part of the wedge pin that has passed through retaining clip 78. Pin 86 is located next to retaining clip 78 in order to prevent the pin from backing out of retaining clip 78.

Referring again to FIG. 4, inlet opening 64' is vertically aligned with an outer portion of retention space opening 66' such that the outer boundary of inlet 64' is coextensive with the outer retention screen 30' which also forms the outer boundary of the retention space opening 66'. Inlet opening 64' is aligned with an outer portion of retention space opening 66' as a further protection against fines plugging centerpipe 32'. As gas flows from outer retention screen 30' across the bed to centerpipe 32', the gas flow can cause fine particles to migrate inwardly through the bed toward inlet screen 32'. To the extent that any fine particles are present in the catalyst entering retention space 66', alignment of the inlet 64' with the outside of the retention space opening 66' increases the path that fines must travel horizontally before they can reach the centerpipe 32'.

As mentioned previously, inlet opening 64 and inlet opening 64' have an annular arrangement in the particular embodiment described herein. The annular arrangement is preferred but not essential for the practice of this invention. A series of discrete inlet openings could be provided at the top of the cover plate with a series of downwardly sloped cover plate sections that extend circumferentially between inlet openings and maintain an angle at least equal to the angle of repose of the particulate material.

Figure 6:
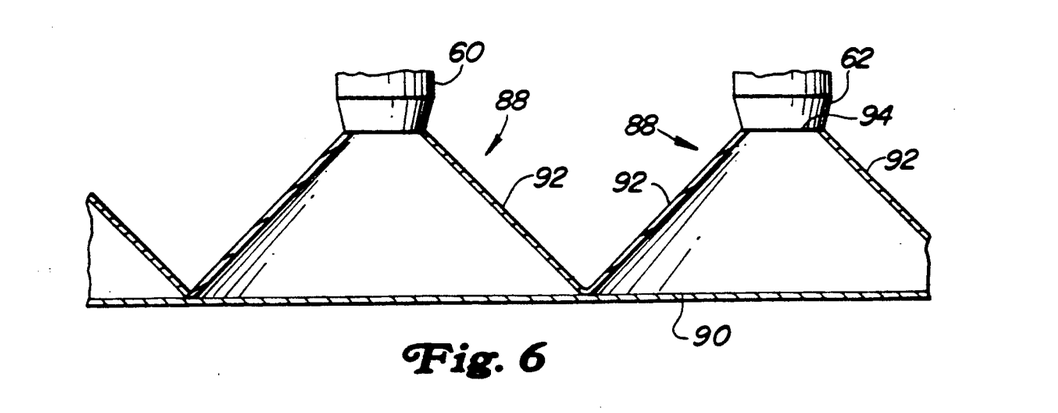
FIG. 6 is a transverse view of the catalyst ducts shown in FIG. 4.

FIG. 4 shows the annular opening 64' that extends around the entire retention space opening 66'. FIG. 6 shows a preferred way of distributing catalyst particles from the catalyst transfer pipes over the entire area of annular opening 64'. FIG. 6 shows a series of scoops 88 that collectively cover the entire area of inlet opening 64'. Each of the scoops have a uniform width equal to the radial width of annular opening 64' and an elongated opening 90 at its bottom that provides an enlarged end. A number of scoops are spaced around the inlet opening such that collectively the openings 90 cover the entire circumferential length of inlet opening 64'. Upwardly converging sidewalls 92 extend from opening 90 at the bottom of the scoops to a catalyst supply nozzle 94 at the top. The catalyst supply nozzle is welded to the reducer section 62 which ultimately communicates a catalyst transfer pipe with the scoop 88. The upwardly converging sidewalls 92 have a slope that again at least equals the static angle of repose of the catalyst particles so that catalyst particles completely fill the volume of the scoop and there are no void areas left into which catalyst particles may be displaced by the void blowing forces at the outer retention screen. The use of straight sidewalls minimizes the height of the scoops and allows the relatively small diameter catalyst transfer pipes to provide the necessary resistance to upward pressure.

Figure 7:
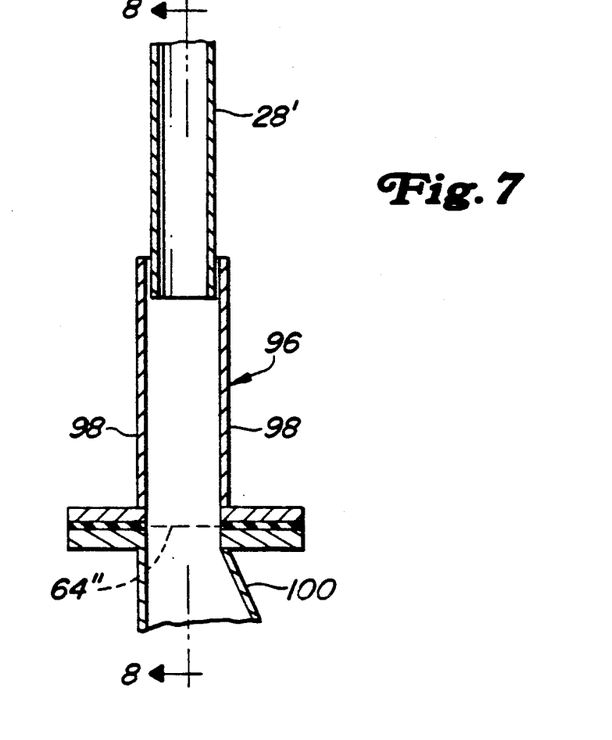
FIG. 7 is an alternate arrangement for the ducts shown in FIG. 4 and 6.

As an alternative to the scoops shown in FIG. 6, catalyst particles may be transferred from the catalyst transfer pipes to the inlet opening in a simplified arrangement that uses a hopper above the inlet opening. This arrangement is shown in FIG. 7. In this arrangement, a catalyst transfer pipe 28' delivers catalyst particles directly to a hopper 96 that is defined by vertical sidewalls 98. Vertical sidewalls 98 extend upwardly from inlet opening 64". Catalyst transfer pipe 28' extends into the interior of catalyst hopper 96. There is no attachment between catalyst transfer pipe 28' and the hopper 96 so that the transfer pipes are free to move relative to the hopper and retention screen assembly. In addition, the hopper construction permits sidewalls 98 to be unattached so that the outer retention screen and the centerpipe are free to expand at different rates and the previously described sliding cover plate assembly may be replaced with a solid cover plate 100.

Figure 8:
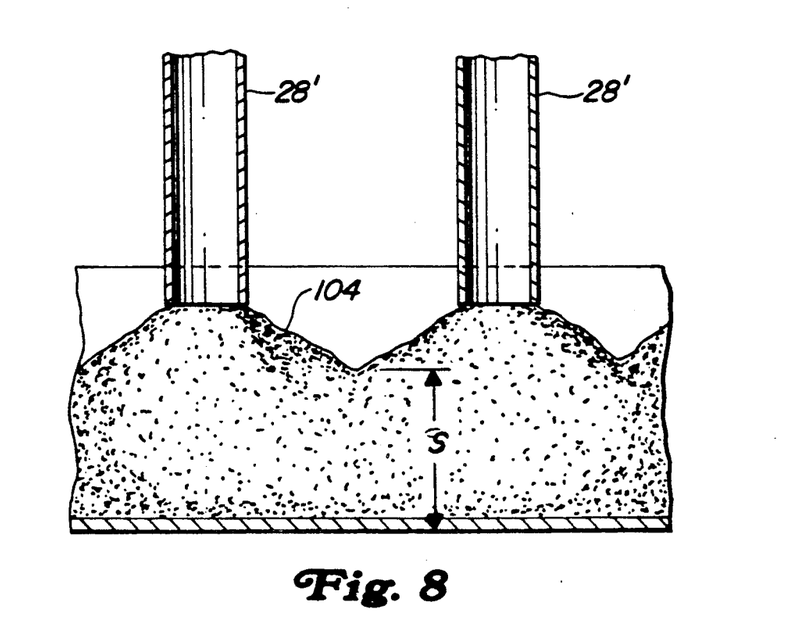
FIG. 8 is a partial side view of FIG. 7.
Figure 9:
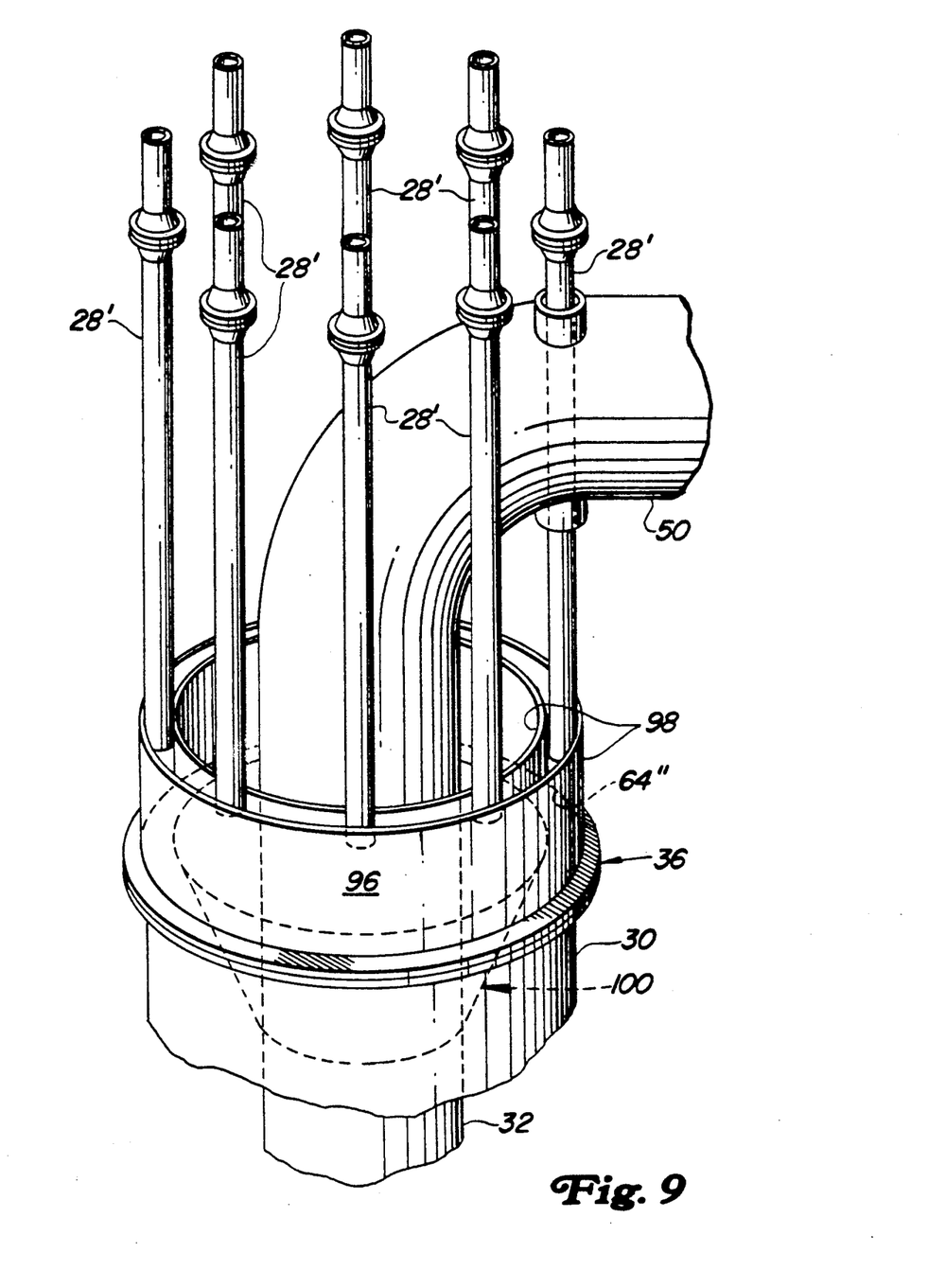
FIG. 9 shows the catalyst ducts of FIGS. 7 and 8 in an enlarged section of the reactor of FIG. 1.
Figure 10:
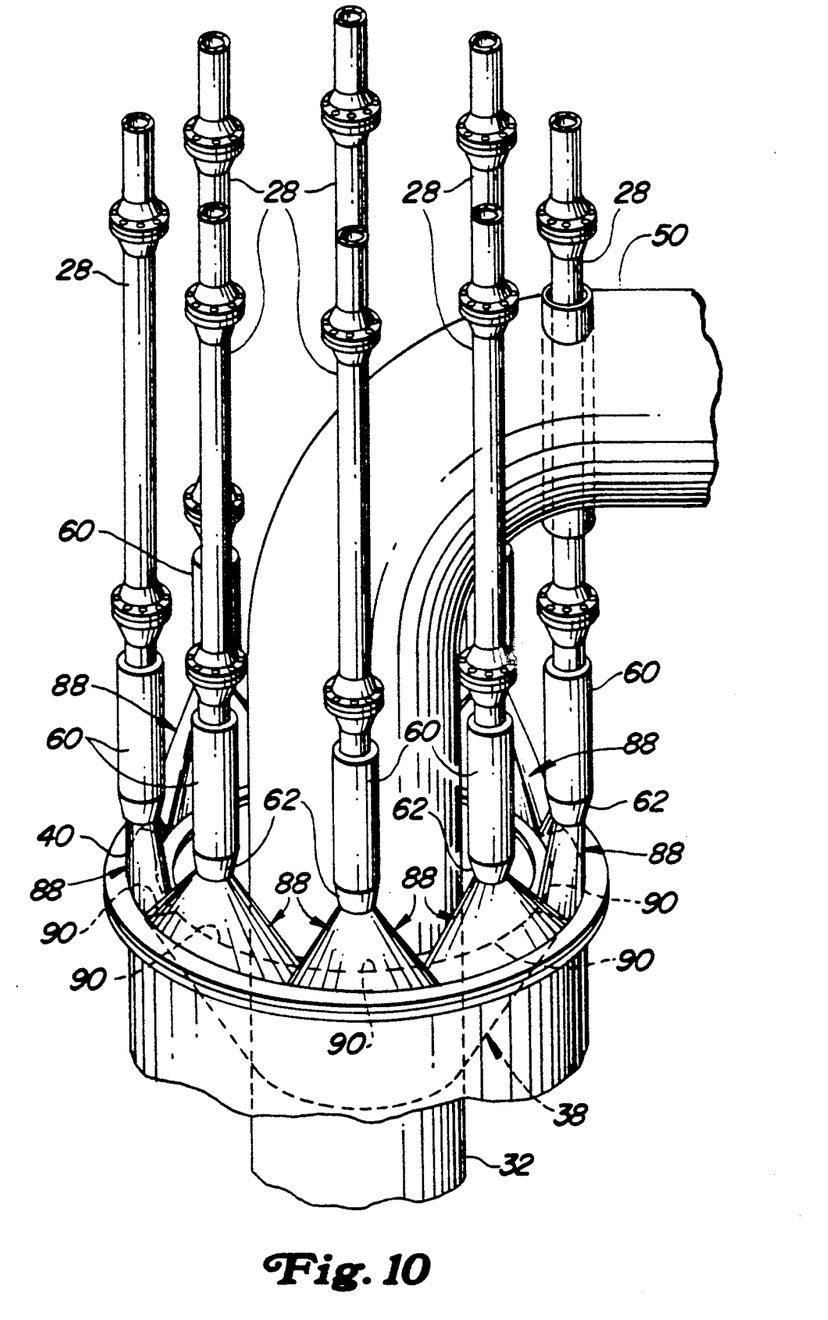
FIG. 10 shows the catalyst ducts of FIGS. 3 and 4 in an enlarged section of the reactor of FIG. 1.

As shown in FIG. 8, the hopper 96 provides resistance to upward pressure from the catalyst bed by providing a sufficient height of catalyst, indicated by letter S, in the hopper. Referring again to FIG. 8, the catalyst transfer pipes 28 are spaced around the circumference of the upper hopper annulus. The circumferential space between catalyst transfer pipes 28' in the hopper 96 is filled by catalyst particles 102 that form an upper surface. The surface 104 proceeds outwards from each transfer pipe 28 at the angle of repose of the catalyst until it intersects the sloped catalyst surface from the next adjacent transfer pipe. The distance S is measured from the intersection point to opening 64". Due to the unconfined nature of surface 104, the height of catalysts between the bottom point of surface 104 and inlet opening 64' must be sufficient to resist the upward pressure on the catalyst bed and any vertical gas flow. Therefore, the hopper arrangement of FIG. 7 and 8 has the overall advantage of simpler construction but may require additional hopper height as opposed to the scoop arrangement of FIG. 6 where the catalyst held in the transfer pipes can also supply resistance to upward forces on the catalyst bed.

I claim:

1. An apparatus for effecting contact of a horizontal flow of gaseous material with a bed of particulate material, said apparatus comprising:
    (a) a pair of vertically and horizontally elongated partitions, in a spaced apart relationship, at least partially defining a particle retention space and a retention space opening at an upper locus of said partitions for passing particles into said retention space, said partitions having a plurality of perforations to permit transfer of a gaseous material across said particle retention space, and said particle retention space opening having a transverse length coextensive with the horizontal length of said partitions;
    (b) a top bed closure at least partially defining the top of said particle retention space, said closure having an imperforate cover plate overlying said retention space opening and defining a top bed closure inlet opening at an upper locus of said top closure, said top bed closure inlet opening lying in a horizontal plane, having a smaller cross-sectional area than the cross-sectional area of said retention space opening and extending horizontally over the transverse length of said particle retention space opening, and said cover plate having at least one surface facing the inside of said retention space, that extends from said top bed closure inlet opening to said partitions and slopes downward from the periphery of said inlet opening at an angle; and
    (c) means for passing particulate material into said top bed closure inlet opening and for resisting upward pressure of catalyst particles out of said top bed closure inlet opening over the entire horizontal length of said inlet opening.

2. A radial flow bed arrangement for contacting particulate material with a gaseous material, said arrangement comprising:
    (a) a vertically oriented centerpipe having a plurality of perforations and a hollow interior for gas transfer;
    (b) a vertically elongated retention screen surrounding said centerpipe and defining an annular retention space between said centerpipe and said retention screen for retaining particles, and together with said centerpipe defining an annular retention opening at the top of said annular retention space;
    (c) means for transferring gaseous material across said centerpipe and said outer retention screen to establish gas flow across said annular retention space;
    (d) an imperforate cover plate covering said annular retention opening at its lower end to retain particles in said retention space, said cover plate defining a particle inlet opening at its uppermost end, said particle inlet opening having an annular shape that extends over the entire annulus of said annular retention opening and a total cross-sectional area that equals less than half of the cross-sectional area of said annular retention opening, and said cover plate having a first surface facing the inside of said retention space that extends from said inlet opening to said centerpipe and a second surface that extends from said inlet opening to said outer retention screen and each of said surfaces slopes downward from said inlet opening;
    (e) at least one duct extended vertically from and in communication with the entire annular length of said particle inlet opening for transferring particles into said particle retention space and holding particles above said particle inlet opening; and
    (f) means for intermittently withdrawing particles from the bottom of said particle retention space.

3. The arrangement of claim 2 wherein said vertically extended duct is annular in cross-section, a plurality of particle supply conduit extend into said duct and are spaced around said duct, and the bottom of the conduits are spaced above said particle inlet opening by a distance equal to at least half the distance between said particle supply conduits.

4. The arragement of claim 2 wherein the vertical projection of said inlet particle opening at least partially borders one of said outer retention screen and said centerpipe.

5. The arrangement of claim 4 wherein said means for transferring gaseous material distributes gaseous material along the outside of said outer retention screen and collects gas from said centerpipe, and said vertical projection of said inlet opening at least partially borders said outer retention screen.

6. The arrangement of claim 5 wherein said at least one vertically extended duct comprises a plurality of scoops having enlarged lower ends that collectively cover inlet opening, each scoop has upwardly converging sidewalls that extend from the enlarged end to a particle supply nozzle, and the lower end of a particle conduit communicates with said nozzle.

7. In an apparatus for contacting a bed of particulate material with a radial gas flow comprising a pair of vertically and horizontally elongated partitions, in a spaced apart relationship, said partitions at least partially defining a particle retention space and a retention space opening at an upper locus of said partitions for passing particles into said retention space and said partitions having a plurality of perforations to permit transfer of the gaseous material across said particle retention space and said particle retention space opening having a transverse length, coextensive with the horizontal length of said partitions, a top bed closure at least partially defining the top of said particle retention space, said closure having an imperforate cover plate overlying said retention space opening and defining a top bed closure inlet opening at an upper locus of said top closure and said top bed closure inlet opening lying in a horizontal plane and having a smaller cross-sectional area than the cross-sectional area of said retention space opening, and means for passing particular material into said top bed closure inlet opening; the improvement, wherein said top bed closure inlet opening extends horizontally over the transverse length of said particle retention space opening, said cover plate has at least one surface facing the inside of said retention space, that extends from said top closure inlet opening to one of said partitions and slopes downward from the periphery of said inlet opening at an angle of, and said means for passing particulate material into said top bed closure inlet opening passes particulate material into said top bed closure inlet opening over the entire horizontal length of said inlet opening and resists upward pressure of particulate material out of said top bed closure inlet opening.

8. The apparatus of claim 7 wherein said means for passing and resisting upward pressure of particulate material includes means for retaining particulate material above said top bed closure inlet opening over the entire horizontal length of said inlet opening.

9. The apparatus of claim 8 wherein said means for passing, and resisting upward pressure of, particulate material includes at least two scoops having an enlarged end in closed communication with said top bed closure inlet opening, and upwardly converging sidewalls extending from said enlarged end to a particle supply nozzle, and the lower end of a particle supply conduit is in communication with each nozzle.

10. The apparatus of claim 8 wherein said means for passing and resisting upward pressure includes a pair of vertical sidewalls extending upwardly from said top bed closure inlet opening to form a hopper and a particle supply conduit having an outlet end located in said hopper at a location above said top bed closure inlet opening.

11. The apparatus of claim 7 wherein said top bed closure inlet opening is positioned closer to one partition in said pair of vertically elongated partitions.

* * * * *